(12) United States Patent
Riedl et al.

(10) Patent No.: US 10,623,042 B1
(45) Date of Patent: Apr. 14, 2020

(54) HOLDING DEVICE FOR A DEVICE

(71) Applicant: Rohde & Schwarz GmbH & Co. KG, Munich (DE)

(72) Inventors: Tobias Riedl, Munich (DE); Andreas Fischl, Munich (DE); Daniel Hartl, Munich (DE); Daniel Daehler, Munich (DE); Michael Stritt, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/191,098

(22) Filed: Nov. 14, 2018

(51) Int. Cl.
*H04M 1/04* (2006.01)
*H04B 1/3888* (2015.01)
*H04M 1/18* (2006.01)

(52) U.S. Cl.
CPC ............ *H04B 1/3888* (2013.01); *H04M 1/04* (2013.01); *H04M 1/185* (2013.01)

(58) Field of Classification Search
CPC ........ H04B 1/3888; H04M 1/04; H04M 1/185
See application file for complete search history.

(56) References Cited

U.S. PATENT DOCUMENTS

2014/0360893 A1* 12/2014 Whitten ................. A45C 11/00
206/45.2

FOREIGN PATENT DOCUMENTS

CN 202806603 U 3/2013

* cited by examiner

*Primary Examiner* — Chuong A Ngo
(74) *Attorney, Agent, or Firm* — Christensen O'Connor Johnson Kindness PLLC (57) ABSTRACT

A holding device for a device comprises a mounting part, an anchor part which is configured to be fixed to a housing of the device and a locking element which is partially arranged in the mounting part and which is rotatable within a defined angular range from a release position to a locking position in order to fix the anchor part to the mounting part.

25 Claims, 4 Drawing Sheets

HOLDING DEVICE FOR A DEVICE

TECHNICAL FIELD

Embodiments of the present disclosure refer to a holding device for a device, for example, a mobile device such as a smartphone.

BACKGROUND

Holding devices for devices, for example mobile devices such as smartphones, are well known. However, such holding devices are usually customized for a specific type of device, both in terms of design and holding function.

Yet, it is desired for example in the case of test equipment for quality assessment that different types of devices can be reliably held with the same kind of holding device.

Holding devices are known which can at least to a slight extent adapt to devices with similar geometric dimensions. However, these holding devices reach their limits when it comes to devices with different external dimensions.

Furthermore, holding devices are known which comprise a mounting part which can be fixed to a test device such as a vehicle interior and an anchor part which is intended to be fixed to a rear surface of a device, wherein the anchor part can be fastened to the mounting part by means of a bayonet fitting. However, in order to fasten the anchor part to the mounting part, the anchor part has to be rotated together with the device, for example about 45°, in order to reliably fasten the anchor part to the mounting part. Yet, in some measurement setups, there is no sufficient space to enable such a rotation.

SUMMARY

Therefore, it is an object of the present disclosure to provide, for example, a holding device which is able to reliably hold various devices which differ from each other in their outer dimensions and which is suited for confined space conditions.

According to the disclosure, this problem is solved by providing a holding device for a device, comprising a mounting part, an anchor part which is configured to be fixed to a housing of the device and a locking element which is partially arranged in the mounting part and which is rotatable within a defined angular range from a release position to a locking position in order to fix the anchor part to the mounting part.

It is an advantage of the holding device that it is not necessary to rotate the anchor part in order to fasten the anchor part to the mounting part, but only the locking element. The locking element can be made smaller in its dimensions than the device to which the anchor part is fixed in order to mount the device. Therefore, the holding device according to the present disclosure is particularly suitable for narrow spaces which do not allow a rotation of the anchor part when the anchor part is fixed to a device and the like. Moreover, a handling of the holding device is very easy for a user since the device can simply be lift of from the holding device in a direction towards the user.

Of course, the anchor part can only be fixed to the mounting part when it is in a mounting position. The mounting position is a position in which the anchor part at least partially engages in the mounting part.

It is possible that several different types of devices can be fixed to one and the same mounting part by providing several identical anchor parts which are respectively fixed to the different devices. Thus, it is possible to test different devices likewise in one holding device.

Since the holding device is suitable for different devices which differ in their dimensions, the holding device can be produced in higher quantities, which has a positive effect on unit costs. Furthermore, the need to develop new holding devices for new devices is eliminated.

According to one embodiment, the locking element is a lever which protrudes from the mounting part. Thereby, the locking element is for example partially accessible for a user. For example, the locking element is configured so that a user can easily grab and rotate the locking element in order to fix the anchor part to the mounting part.

According to one embodiment, the locking element is rotatable within a range between 2° and 20°. Thus, the motion rage of the locking element is quite small and only a small clearance is necessary to enable a reliable fixation of the anchor part. Of course, a wider range of motion is always conceivable when the necessary clearance is existing.

The locking element can be engaged in the mounting part, for example by a snap-in connection. For example, the locking element is engaged in the mounting part such that it cannot accidentally fall out of the mounting part. Thereby, it is inhibited that the locking element gets lost, especially when no anchor part is fixed to the mounting part. For example one of the mounting part and the locking element may comprise a protrusion and the other one of the locking element and the mounting part may comprise a slot. The slot is preferably dimensioned such that the protrusion moves in the slot when the locking element is moved from the release position to the locking position.

Furthermore, the mounting part may comprise holding means configured to releasably hold the locking element in the locking position. Such holding means for example comprise a protrusion, for example a nose. In some embodiments, when the locking element is moved from the release position to the locking position or the other way round, the locking element has to snap over the protrusion respectively the nose. The force required to overcome the protrusion may be such that the locking element cannot move from the release position to the locking position or other way round without a user turning the locking element, vibrations which for example occur during a test operation or, when the holding device is mounted in a vehicle, during a vehicle ride, are not sufficient to shift the locking element from the release position to the locking position or vice versa. Accordingly, it is prevented that the anchor part can be released from the mounting part accidentally.

Additionally or alternatively, the mounting part and the locking element may comprise holding means configured to releasably hold the locking element in the release position. Thus, the locking element is inhibited from moving into the locking position before an anchor part is brought into the mounting position. Thereby, it is prevented that the locking element blocks the engagement of the anchor part to the mounting part.

The holding means for holding the locking element in the locking position and the holding means for holding the locking element in the release position may be one and the same. Alternatively, different holding means may be provided.

According to one embodiment, the mounting part and the anchor part each comprise at least one ring-shaped web, which axially protrudes from the mounting part and the anchor part, respectively, and wherein the webs are arranged concentrically and overlap each other in an axial direction when the anchor part is in a mounting position. Due to the overlap in the axial direction, a fixation of the anchor part to the mounting part is easily possible. Due to the ring-shape of the webs, forces in the radial direction can be absorbed particularly well.

For aligning the anchor part at the mounting part, the inner and outer surfaces of ring-shaped webs contact each other. Of course, a minimal play is necessary due to manufacturing tolerances.

For example, the ring-shaped webs each protrude from a base plate of the anchor part and the mounting part.

In some embodiments, each of the mounting part and the anchor part comprise several of the ring-shaped webs. Thereby, a force occurring during a test mode for example due to vibrations can be distributed on the several ring-shaped webs. Thus, a mechanical shock load can be absorbed by the holding device.

According to one embodiment, the ring-shaped webs of the mounting part and the anchor part each comprise at least one slot extending in a peripheral direction of the ring-shaped webs wherein the slots overlap when the anchor part is in a mounting position. This allows the locking element to engage both the mounting part and the anchor part at the same time.

The slots in some embodiments are, viewed in an axial direction, partially accessible and partially covered. For example, the slots are covered by a finger-shaped protrusion which extends from a free edge of the ring-shaped web. In other words, the ring-shaped webs comprise at least one L-shaped cut-out with an axially extending portion and a peripheral portion. This allows the locking element to fix the anchor part to the locking element in an axial direction, when the anchor part is in the mounting position. For example, the locking position of the locking element is a position in which the locking element is at least partially located beneath the finger-shaped protrusion of the mounting part and the anchor part, viewed in an axial direction.

The ring-shaped webs of the mounting part and the anchor part may each comprise an equal number of several slots which are evenly distributed in peripheral direction, wherein the number of slots defines a number of possible mounting positions in which the anchor part can be fixed to the mounting part. Due to this feature, several advantages can be achieved. Firstly, because of the number of possible mounting positions, the anchor part respectively the device to which the anchor part can be fixed can be arranged in different positions as needed, for example in a vertical and horizontal orientation. Furthermore, when providing several slots, a force which acts in an axial direction can be distributed along a circumference of the ring-shaped webs, for example to several of the finger-shaped protrusion covering the slots. Thereby, the risk that the finger-shaped protrusions might break due to the occurring load is reduced.

According to one embodiment, the locking element comprises at least one outer ring from which at least one locking bar protrudes towards a center of the ring, wherein the ring concentrically surrounds the at least one ring-shaped web of the mounting part and the locking bar extends through the at least one slot of the mounting part and the anchor part. By a locking bar, for example, the anchor part can be fixed to the mounting part.

The locking element may comprise several locking bars protruding towards the center of the outer ring, wherein the number of locking bars corresponds to the number of slots in one ring-shaped web of the mounting part respectively the anchor part. Thereby, an even force distribution in the holding device can be achieved and the holding device may be particularly reliable.

The locking bars are for example connected by a ring element which is arranged concentrically within the outer ring. This means that the locking element can be particularly stable. Furthermore the locking element may be supported by the mounting part since the inner and outer ring may abut the ring-shaped webs of the mounting part.

According to one embodiment, wherein the mounting part and/or the anchor part comprise alignment means which are configured to rotationally fix the anchor part and the mounting part with respect to each other when the anchor part is in a mounting position. This prevents the anchor part from twisting relatively to the mounting part due to vibrations and thus from unintentionally loosening the fixed connection between the anchor part and the mounting part.

The alignment means may comprise at least one protrusion in the mounting part and/or the anchor part and at least one corresponding recess in the other one of the mounting part and the anchor part. This makes it easy to create a rotation lock. The protrusion and/or the slots may extend in a radial direction.

In some embodiments, the mounting part and/or the anchor part and/or the locking element are each formed as one-piece, for example as injection-molded parts. Thus, the holding device can be manufactured cost effective in high quantities.

All parts are preferably made of materials that cannot trigger touch events. For example, all parts are made of plastic materials.

Furthermore, according to some embodiments of the disclosure, the objective technical problem is solved by providing a holding device for releasably fixing a device, comprising a mounting part adapted for being fixed to a support, an anchor part adapted for being fixed to a rear surface of the device, and a locking element mounted to the mounting part so as to be pivotable between a locking position and a release position, the mounting part having a plurality of concentric, ring-shaped webs extending from the mounting part, the webs being divided in a plurality of segments, each ring comprising in each segment an L-shaped cut-out with an axially extending portion and a peripheral portion which is arranged between a base part of the mounting part and a portion of the web, the anchor part having a plurality of concentric, ring-shaped webs extending from the anchor part, the webs being divided in a plurality of segments, each ring comprising in each segment an L-shaped cut-out with an axially extending portion and a peripheral portion which is arranged between a base part of the anchor element and a portion of the web, the cut-outs of mounting part and the cut-outs of the anchor part being arranged side by side when the anchor part is mounted to the mounting part, the locking element having a plurality of radial locking bars which are located, in a mounted condition of the device, in the peripheral portions of the cut-outs so as to axially lock the anchor part to the mounting part.

Such a holding device has the advantage that the anchor part can be anchored to the mounting part simply by pivoting the locking element.

Since the anchor part is adapted for being fixed to a rear surface of the device side edges and a display area of the device can remain accessible. This is also advantageous with regard to heat dissipation from the device during operation.

In some embodiments, the anchor part has a flat surface adapted for receiving an adhesive with which the rear surface of the device is fixed to the anchor part. Thus, the anchor part is suited for being fixed to all thinkable kinds of devices. The only requirement for a reliable bonding between the device and the anchor part is that the device has a flat surface at least in a section nearly as large as the base part of the anchor part.

Radially extending walls may separate the individual segments from each other. The radial extending walls may also act as alignment means as described above. For example, the radially extending walls constitute are part of the alignment means.

For example, four walls are provided. That means the anchor part may be fixed to the mounting part in four positions. Preferably, the walls are spaced evenly along a peripheral circumference. For example, the walls are arranged perpendicularly to each other. The walls can also absorb circumferentially acting forces.

According to one embodiment, the free end of the portion of the web which defines the peripheral portion of the cut-out comprises a holding nose for holding the locking element in the locking position. Thereby, the locking element may be releasably held in the locking position and an unintentional rotation of the locking element may be inhibited.

The radial locking bars may be connected to each other by means of a central connecting ring which is arranged adjacent the innermost one of the webs.

Additionally or alternatively, the radial locking bars may be connected to each other by means of an outer connecting ring which is arranged adjacent the outermost one of the webs, the outermost one of the webs being associated with the mounting part.

The aforementioned features ensure that the locking element is stably mounted in the mounting part.

According to one embodiment, the outermost of the webs is associated with the mounting part and the outer connecting ring may have engagement means for axially retaining the locking element at the mounting part. Thereby, the locking element cannot get lost, even if the locking element is in the release position and no anchor part is engaged in the mounting part.

The engagement means may comprise a plurality of slits in the web and a plurality of engagement lugs projecting radially inwardly from the outer connecting ring. The locking element can thus be attached to the mounting part by means of a snap connection.

Furthermore, according to embodiments of the disclosure, the objective technical problem is solved by providing a holding device for releasably fixing a device, comprising a mounting part adapted for being fixed to a support, an anchor part adapted for being fixed to a rear surface of the device, and a locking element mounted to the mounting part so as to be pivotable between a locking position and a release position, wherein the mounting part and the anchor part each comprise at least one ring-shaped web which are configured such that the ring-shaped webs of the mounting part and the anchor part overlap in an axial direction when the anchor part is in a mounting position, wherein the ring-shaped webs each comprise at least one slot which are arranged flush with each other when the anchor part is in a mounting position, and wherein the locking element comprises at least one locking bar which is moveable within the of the mounting part and the anchor part, wherein the slots are partially covered by finger-shaped protrusions extending in the same circumferential direction, wherein the locking bar of the locking element is covered and axially held in the locking position by the finger-shaped protrusions.

It is obvious that the inventive holding device is not only suitable for means of quality assessment, but also as a customary mobile phone holder or navigation device holder.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
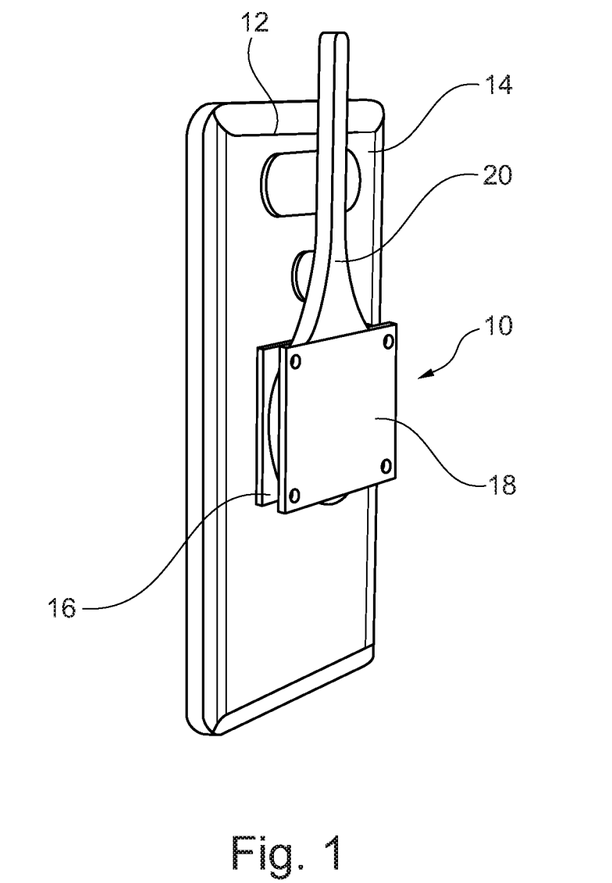
FIG. 1 illustrates a representative embodiment of holding device according to the present disclosure.

FIG. 1 shows a holding device 10 according to the present disclosure, wherein the holding device 10 is attached to a rear surface 12 of a mobile device 14, for example a smartphone. The holding device 10 comprises an anchor part 16, a mounting part 18 and a locking element 20 which is partially engaged in the mounting part 18. The locking element 20 is mounted to the mounting part 18 so as to be pivotable between a locking position and a release position.

The anchor part 16 is configured to be fixed to the housing of the mobile device 14, for example by gluing or an adhesive tape. For example, the anchor part 16 has a base part 22 with a flat surface which is adapted for receiving an adhesive with which the rear surface 12 of the mobile device 14 is fixed to the anchor part 16.

The mounting part 18 is adapted for being fixed to a support which is not shown in the FIGURES for sake of simplicity. The support may be for example an interior part of a vehicle. For fixing the mounting part 18 to a support, the mounting part 18 comprises a base part 24 with screw holes 26.

For releasably fixing the anchor part 16 to the mounting part 18, the anchor part 16 has to be brought in a mounting position in which the anchor part 16 engages the mounting part 18, as shown in FIG. 1. When the anchor part 16 is in the mounting position, it can be fixed in this position by rotating the locking element 20 within a defined angular range from the release position to the locking position, for example within a range between 2° and 20°, for example between 5° and 15°.

The locking element 20 is a lever in some embodiments, which protrudes from the mounting part 18 such that a user can easily grab and rotate the locking element 20.

Figure 2:
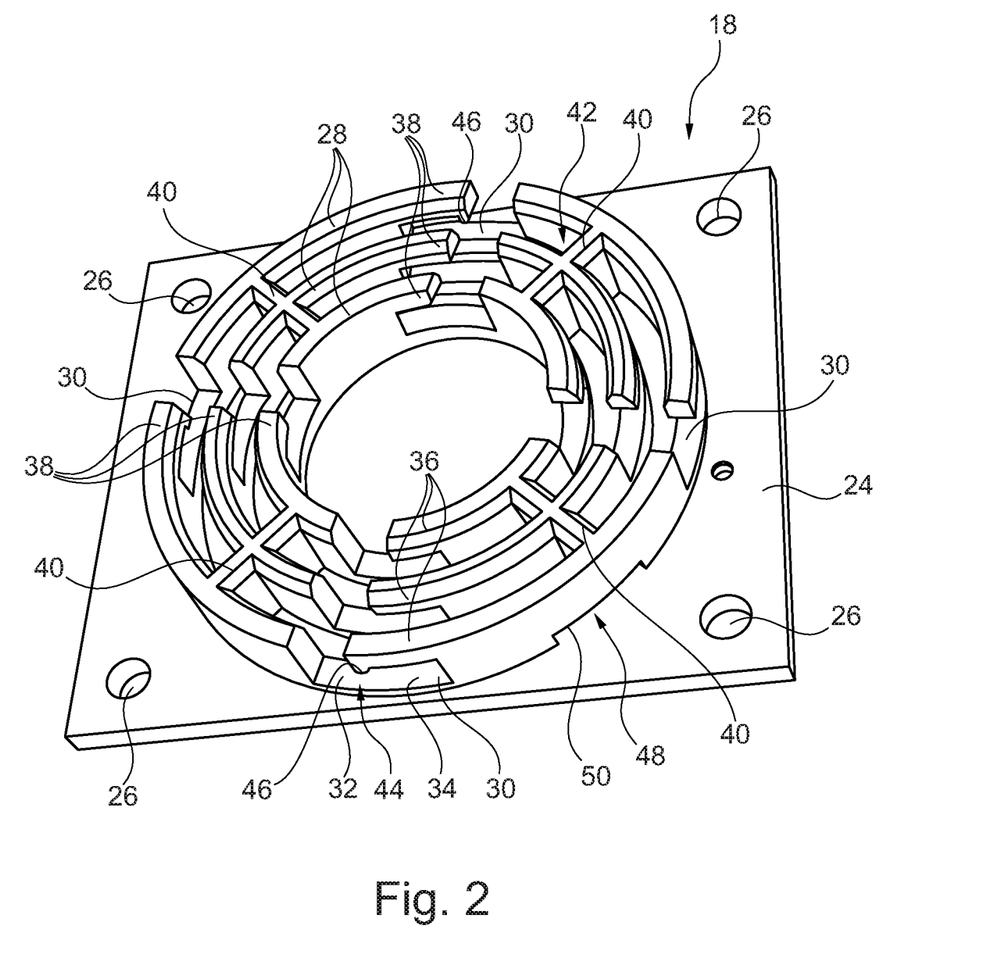
FIG. 2 illustrates one representative embodiment of a mounting part of the holding device of FIG. 1 in a detailed view.
Figure 3:
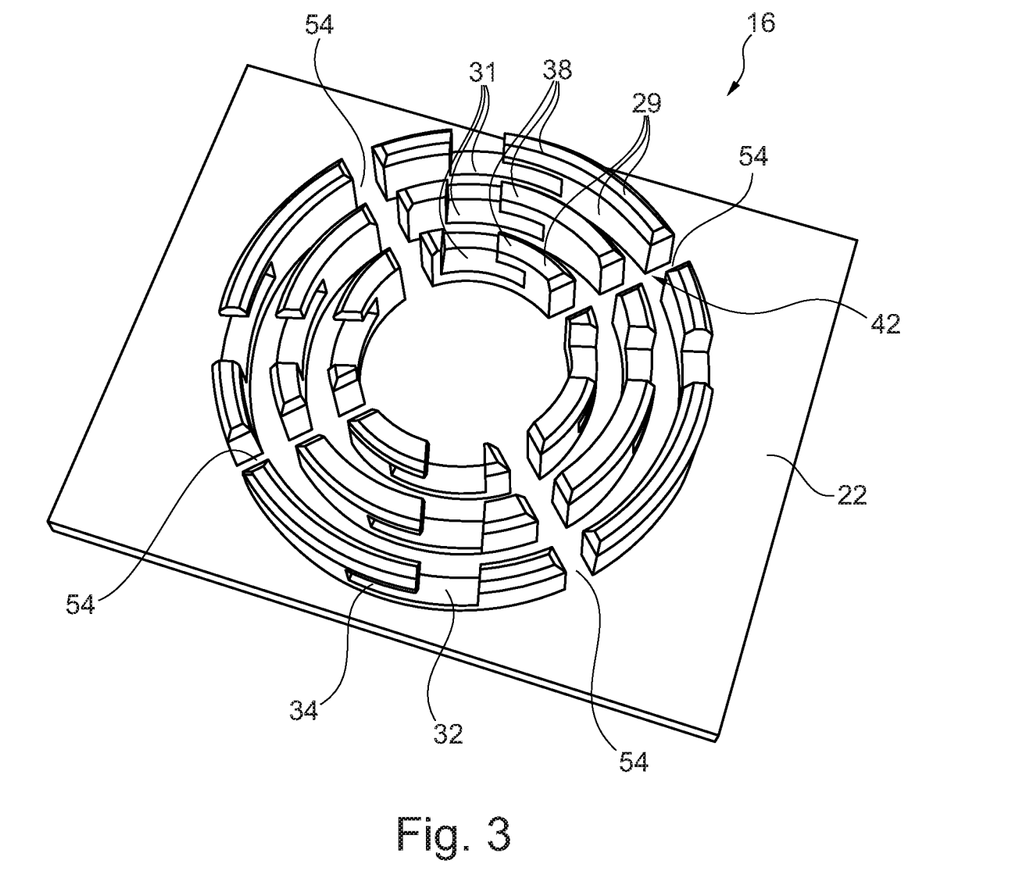
FIG. 3 illustrates one representative embodiment of an anchor part of the holding device of FIG. 1 in a detailed view.
Figure 4:
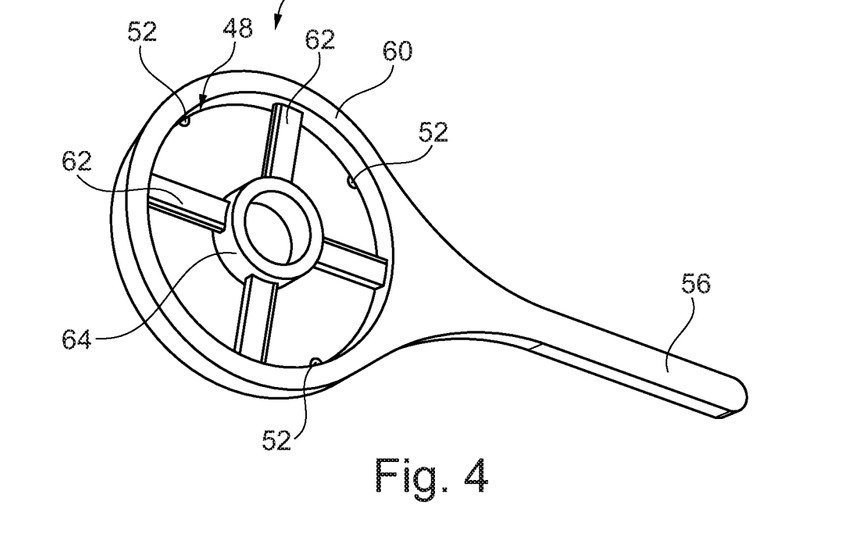
FIG. 4 illustrates one representative embodiment of a locking element of the holding device of FIG. 1 in a detailed view.

A detailed view of the elements of the holding device 10 is shown in FIGS. 2 to 4. FIG. 2 shows a detailed view of one representative embodiment of a mounting part 18. The mounting part 18 has several concentric ring-shaped webs 28, for example three webs 28, which protrude from the mounting part 18, for example from the base part 24, in an axial direction. The base part 24 is formed as a plate.

The ring-shaped webs 28 are divided in a plurality of segments, for example four segments, by means of four radially extending walls 40 which separate the individual segments from each other. The radially extending walls 40 are part of alignment means 42 which are configured to rotationally fix the anchor part 16 and the mounting part 18 with respect to each other when the anchor part 16 is in the mounting position. For this purpose, the walls 40 constitute a protrusion of the alignment means.

The ring-shaped webs 28 of the mounting part 18 comprise several slots 30, for example four slots 30, extending in a peripheral direction of the ring-shaped webs 28. In some embodiments, one slot 30 is provided in each segment of each ring-shaped web 28.

The slots 30 are, viewed in an axial direction, at least partially accessible and partially covered. In other words, the slots 30 are formed by L-shaped cut-outs with an axially extending portion 32 and a peripheral portion 34. The peripheral portion 34 is arranged between the base part 24 of the mounting part 18 and a portion 36 of the ring-shaped web 28. For example, the slots 30 are covered by a finger-shaped protrusion 38 which extends from a free edge of the ring-shaped web 28.

For releasably holding the locking element 20 in the locking position and/or the release position, the holding device 10 comprises holding means 44. The holding means 44 are designed such that the locking element 20 cannot unintentionally move from the locking position to the release position and vice versa, but only when a user turns the locking element 20. For example, the free end of the portion of the ring-shaped web 28 which defines the peripheral portion of the slots 30, for example the L-shaped cut-outs, comprises a holding nose 46 for holding the locking element 20 in the locking position and/or the release position which has to be overcome when the locking element 20 is moved from the locking position to the release position or the other way round. In the embodiment as shown in FIG. 2, only one holding nose 46 is provided at each segment. Yet, every finger-shaped protrusion 38 could be provided with a holding nose 46.

For engaging the locking element 20 to the mounting part 18 loss prove, engagement means 48 are provided, which comprise a plurality of slits 50 in the ring-shaped web 28 which interact with engagement lugs 52 of the locking element 20. This will be described later. A peripheral length of the slits 50 corresponds to a possible range of motion of the locking element 20.

FIG. 3 shows one representative embodiment of an anchor part 16 of the holding device 10. Basically, the anchor part 16 is formed similar to the mounting part 18. Namely, the anchor part 16 also has several concentric ring-shaped webs 29, for example three webs 29, which protrude from the anchor part 16, for example from the base part 22, in an axial direction. The base part 22 is formed as a plate.

Furthermore, the ring-shaped webs 29 of the anchor part 16 are divided in a plurality of segments, for example four segments, however not by means of radially extending walls, but by means of recesses 54 or rather cutouts in the ring-shaped webs 29 which separate the individual segments from each other.

The recesses 54 are also part of the alignment means 42 which are configured to rotationally fix the anchor part 16 and the mounting part 18 with respect to each other. For example, when the anchor part 16 is in the mounting position, the radially extending walls 40 of the mounting part 18 are located in the recesses 54 of the anchor part 16, whereby a rotation between the anchor part 16 and the mounting part 18 is inhibited. Such a rotational lock is important to prevent the parts 16, 18 from twisting against each other due to vibrations during driving and thus to prevent the locking mechanism from being released unintentionally.

The ring-shaped webs 29 of the anchor part 16 further differ from the ring-shaped webs 28 of the mounting part 18 in their diameter. For example, the diameter of the ring-shaped webs 29 of the anchor part 16 is such that the ring-shaped webs 29 of the anchor part 16 can engage in the mounting part 18 and overlap the ring-shaped webs 28 of the mounting part 18 in an axial direction. For example the ring-shaped webs 29 of the anchor part 16 are arranged concentrically to the ring-shaped webs 28 of the mounting part 18.

The ring-shaped webs 29 of the anchor part 16 likewise comprise several slots 31, for example four slots 31, extending in a peripheral direction of the ring-shaped webs 29. In some embodiments, one slot 31 is provided in each segment of each ring-shaped web 29.

The form of the slots 31 of the anchor part 16 is basically identical to the form of the slots 30 of the mounting part 18. The only difference is that the slots 31 of the anchor part 16 are configured inversely to the slots 30 of the mounting part 18. This means that the slots 30, 31 are open in the same circumferential direction when the anchor part 16 is in the mounting position.

Due to this inverse configuration of the slots 30, 31, the slots 30, 31 overlap each other, more precisely are aligned flush to each other when the anchor part 16 is in the mounting position. In other words, the slots 30, 31 together form a channel, for example a flaring channel.

The alignment means 42 ensure that the parts 16, 18 are aligned with each other in a correct position to form the channel. However, the anchor part 16 can be mounted to the mounting part 18 in several appropriate positions. In the embodiment shown in the FIGURES, four appropriate positions are possible.

In some embodiments, the ring-shaped webs 28, 29 of the mounting part 18 and the anchor part 16 each comprise an equal number of several slots 30, 31 which are evenly distributed in peripheral direction, wherein the number of slots 30, 31 defines a number of possible mounting positions in which the anchor part 16 can be fixed to the mounting part 18.

Within this channel, the locking element 20 can be pivoted, as will be described henceforth.

FIG. 4 shows one representative embodiment of a locking element 20 of the holding device 10. The locking element 20 comprises a handle 56 which may be gripped by a user in order to pivot the locking element 20. Furthermore, the locking element 20 comprises a locking section 58 which is engaged with the mounting part 18 and is provided for locking the anchor part 16 to the mounting part 18.

For this purpose, the locking element 20 comprises one outer connecting ring 60 from which four locking bars 62 protrude towards a center of the ring 60. At the center, the locking bars 62 are connected by means or a central connecting ring 64 which is arranged concentrically within the outer ring 60. The number of locking bars 62 corresponds to the number of slots 30, 31 in one ring shaped web 28, 29.

Figure 5A:
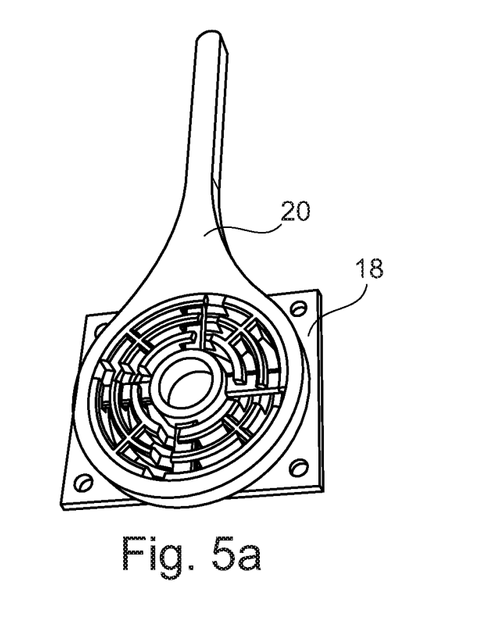
FIGS. 5a and 5b illustrate the holding device in a locked condition and in an unlocked condition.
Figure 5B:
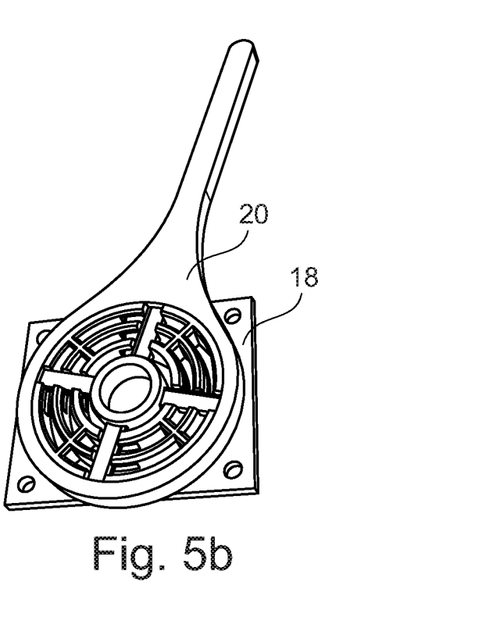

The outer connecting ring 60 concentrically surrounds the outermost ring-shaped web 28 of the mounting part 18, as can be seen in FIGS. 5a and 5b, which show the locking element 20 engaged to the mounting part 18 in a locking position (FIG. 5a) and a release position (FIG. 5b). The anchor part 16 is not shown in FIGS. 5a and 5b for better understanding.

The central connecting ring 64 is arranged adjacent the innermost of the ring-shaped webs 28, 29.

When the locking element 20 is engaged with the mounting part 18, the locking bars 62 extend through the slots 30, 31 or in other words through the channels formed by the slots 30, 31.

When the locking element 20 is in its locking position, the locking bars 62 are located in the peripheral portions 34 of the slots 30, 31 as shown in FIG. 5a. Thereby, the anchor part 16 is fixed to the mounting part 18. When the locking element 20 is in its release position, the locking bars 62 are located in the axially extending portions 32 of the slots 30, 31 as shown in FIG. 5b. Thus, the anchor part 16 can easily be released form the mounting part 18.

As can be seen in FIG. 4, the locking element 20 comprises a plurality of engagement lugs 52 projecting radially inwardly from the outer connecting ring 62. These lugs 52 can protrude into the slits 50 of the mounting part 18 which are shown in FIG. 2. Thereby, the locking element 20 is axially secured to the mounting part 18.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A holding device for a device, comprising:
a mounting part, an anchor part which is configured to be fixed to a housing of the device and a locking element in the form of a lever which is partially arranged in the mounting part and protrudes therefrom, the locking element being rotatable within a defined angular range from a release position to a locking position in order to fix the anchor part to the mounting part,
wherein the mounting part, the anchor part, and the locking element are each formed as one-piece.

2. The holding device according to claim 1, wherein the locking element is rotatable with respect to at least the mounting part.

3. The holding device according to claim 1, wherein the locking element is rotatable within a range between 2° and 20°.

4. The holding device according to claim 1, wherein the locking element is engaged in the mounting part.

5. The holding device according to claim 1, wherein the mounting part comprises holding means configured to releasably hold the locking element in the locking position.

6. The holding device according to claim 1, wherein the mounting part and the locking element comprise holding means configured to releasably hold the locking element in the release position.

7. The holding device according to claim 1, wherein the mounting part and the anchor part each comprise at least one ring-shaped web, which axially protrudes from the mounting part and the anchor part, respectively, and wherein the webs are arranged concentrically and overlap each other in an axial direction when the anchor part is in a mounting position.

8. The holding device according to claim 7, wherein the ring-shaped webs of the mounting part and the anchor part each comprise at least one slot extending in a peripheral direction of the ring-shaped webs and wherein the slots overlap when the anchor part is in a mounting position.

9. The holding device according to claim 8, wherein the slots are, viewed in an axial direction, partially accessible and partially covered.

10. The holding device according to claim 8, wherein the ring-shaped webs of the mounting part and the anchor part each comprise an equal number of several slots which are evenly distributed in peripheral direction, wherein the number of slots defines a number of possible mounting positions in which the anchor part can be fixed to the mounting part.

11. The holding device according to claim 8, wherein the locking element comprises at least one outer ring from which at least one locking bar protrudes towards a center of the ring, wherein the ring concentrically surrounds the at least one ring-shaped web of the mounting part and the locking bar extends through the at least one slot of the mounting part and the anchor part.

12. The holding device according to claim 11, wherein the locking element comprises several locking bars protruding towards the center of the outer ring, wherein the number of locking bars corresponds to the number of slots in one ring-shaped web of the mounting part respectively the anchor part.

13. The holding device according to claim 12, wherein the webs are connected by means of a ring element which is arranged concentrically within the outer ring.

14. The holding device according to claim 1, wherein the mounting part and/or the anchor part comprise alignment means which are configured to rotationally fix the anchor part and the mounting part with respect to each other when the anchor part is in a mounting position.

15. The holding device according to claim 14, wherein the alignment means comprise at least one protrusion in the mounting part and/or the anchor part and at least one corresponding recess in the other one of the mounting part and the anchor part.

16. A holding device for releasably fixing a device, comprising a mounting part adapted for being fixed to a support, an anchor part adapted for being fixed to a rear surface of the device, and a locking element mounted to the mounting part so as to be pivotable between a locking position and a release position, the mounting part having a plurality of concentric, ring-shaped webs extending from the mounting part, the webs being divided in a plurality of segments, each ring comprising in each segment an L-shaped cut-out with an axially extending portion and a peripheral portion which is arranged between a base part of the mounting part and a portion of said web, the anchor part having a plurality of concentric, ring-shaped webs extending from the anchor part, the webs being divided in a plurality of segments, each ring comprising in each segment an L-shaped cut-out with an axially extending portion and a peripheral portion which is arranged between a base part of the anchor part and a portion of said web, the cut-outs of mounting part and the cut-outs of the anchor part being arranged side by side when said anchor part is mounted to said mounting part, said locking element having a plurality of radial locking bars which are located, in a mounted condition of the device, in the peripheral portions of the cut-outs so as to axially lock the anchor part to the mounting part, wherein the locking element is rotatable with respect to the anchor part.

17. The holding device according to claim 16, wherein the anchor part has a flat surface adapted for receiving an adhesive with which the rear surface of the device is fixed to the anchor part.

18. The holding device according to claim 16, wherein radially extending walls separate the individual segments from each other.

19. The holding device according to claim 16, wherein four walls are provided.

20. The holding device according to claim 16, wherein the free end of the portion of the web which defines the peripheral portion of the cut-out comprises a holding nose for holding the locking element in the locking position.

21. The holding device according to claim 16, wherein the radial locking bars are connected to each other by means of a central connecting ring which is arranged adjacent the innermost one of the webs.

22. The holding device according to claim 16, wherein the radial locking bars are connected to each other by means of an outer connecting ring which is arranged adjacent the outermost one of the webs, the outermost one of the webs being associated with the mounting part.

23. The holding device according to claim 16, wherein the outermost of the webs is associated with the mounting part and the outer connecting ring has engagement means for axially retaining the locking element at the mounting part.

24. The holding device according to claim 23, wherein the engagement means comprise a plurality of slits in the web and a plurality of engagement lugs projecting radially inwardly from the outer connecting ring.

25. A holding device for releasably fixing a device, comprising a mounting part adapted for being fixed to a support, an anchor part adapted for being fixed to a rear surface of the device, and a locking element mounted to the mounting part so as to be pivotable between a locking position and a release position, wherein the mounting part and the anchor part each comprise at least one ring-shaped web which are configured such that the ring-shaped webs of the mounting part and the anchor part overlap in an axial direction when the anchor part is in a mounting position, wherein the ring-shaped webs each comprise at least one slot which are arranged flush with each other when the anchor part is in a mounting position, and wherein the locking element comprises at least one locking bar which is moveable within the slots of the mounting part and the anchor part, wherein the slots are partially covered by finger-shaped protrusions extending in the same circumferential direction, wherein the locking bar of the locking element is covered and axially held in the locking position by the finger-shaped protrusions, and wherein the anchor part, the locking element and the mounting part are each separate parts.

* * * * *